July 8, 1924.
H. JUNKERS
VALVE GEAR
Filed Feb. 17, 1921    2 Sheets-Sheet 1
1,500,457
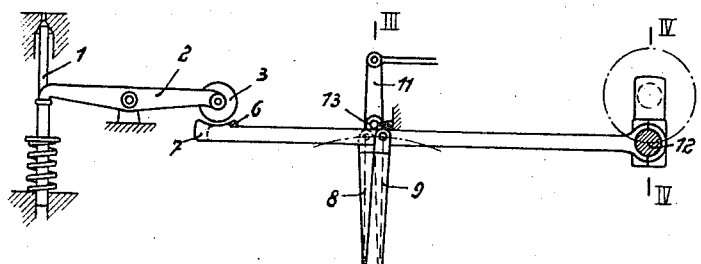
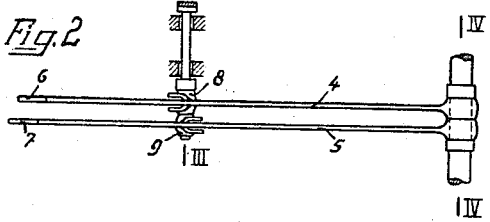
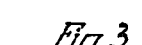
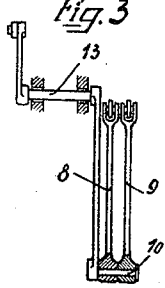
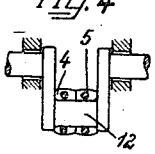
Inventor:
Hugo Junkers

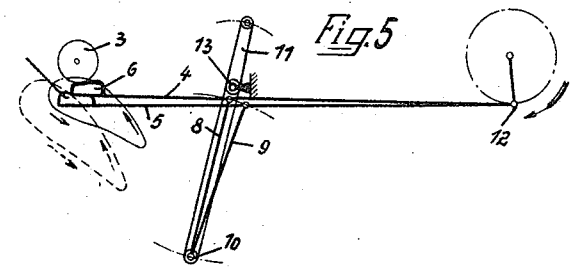
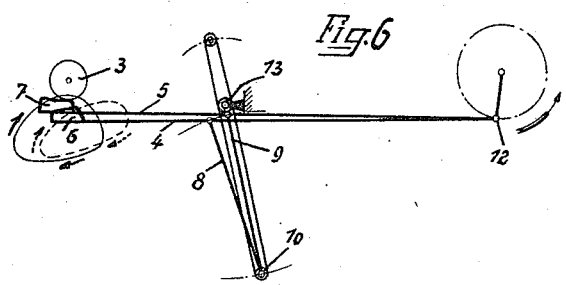
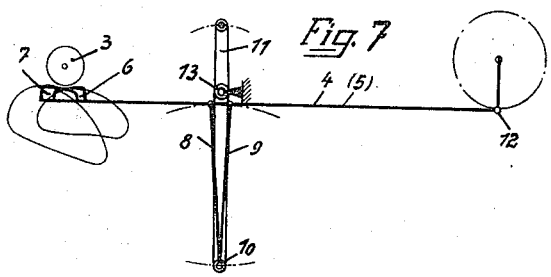
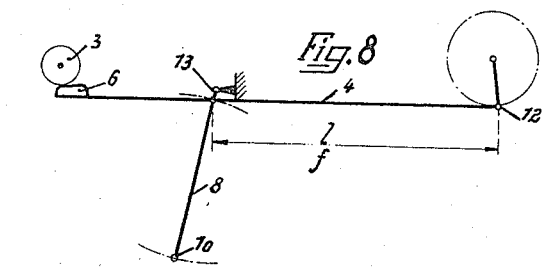
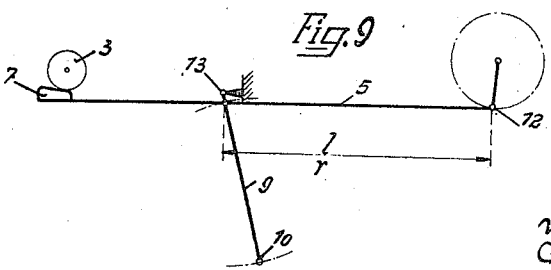

Patented July 8, 1924.

1,500,457

UNITED STATES PATENT OFFICE.

HUGO JUNKERS, OF DESSAU, GERMANY.

VALVE GEAR.

Application filed February 17, 1921. Serial No. 445,908.

*To all whom it may concern:*

Be it known that I, HUGO JUNKERS, a citizen of the German Empire, residing at Dessau, Germany, have invented certain new and useful Improvements in Valve Gears, of which the following is a specification.

My invention refers to valve gear for internal combustion engines and more particularly to improvements in the reversing gear for controlling the fuel injection valve illustrated and described in Patent No. 1,320,063, such gear comprising two sets of mechanism (excentric, excentric rods and links), one set serving for forward running and the other for reversed running.

It is an object of the present invention to reduce the number of parts required by arranging some parts to operate in common both to the forward and the reversing gear, whereby the gear as a whole is greatly simplified and the costs of manufacture are reduced without however giving up any of the advantages inherent in the mechanism before described.

In the valve gear according to the present invention a separate connecting rod and a separate link are provided for forward and for reversed running, while the other parts of the mechanism such as the driving excentric, the pivot of the links and the operating lever carrying said pivot are common both to forward and reversed running. The respective cams are imparted movements corresponding to forward or reversed running by the two connecting rods of unequal length and divided unequally in such a manner that during forward running only the forward cam and during reversed running only the reverse cam contacts with the roller of the valve lever. The single crank or excentric can be constructed far more easily than a double crank or double excentric.

In the drawings affixed to this specification and forming part thereof a valve gear embodying my invention is illustrated diagrammatically by way of example. In the drawings—

Fig. 1 is a side elevation,
Fig. 2 a plan,
Figs. 3 and 4 cross-sections on the lines III—III and IV—IV, respectively, in Figs. 1 and 2.
Figs. 5 to 9 are diagrams illustrating the mode of operation of the improved valve gear, Figs. 5, 6 and 7 showing the paths traversed by a point of each cam on forward and reversed running and on the gear being in its stopping or starting position, respectively, while Figs. 8 and 9 are diagrams illustrating the forward and backward control, respectively, as the valve begins being lifted.

In all the figures 1 is the fuel needle, 2 the valve lever, 3 the roller arranged on the said lever, 4 and 5 the connecting rods and 6 and 7 the cams for forward and reversed running, respectively, 8 and 9 the links for forward and reversed running, respectively, 10 is the pivot and 11 is the operating lever common to both links 8 and 9; 12 is the crank driving the connecting rods, and 13 is the centre of rotation of lever 11.

In the modification disclosed in the drawings the crank 12 fixed either to the engine shaft or to the valve control shaft, so as to retain its position relatively to the main crank of the engine, drives two connecting rods 4 and 5, the former for forward, the latter for reversed running. These rods are governed by links 8 and 9, respectively, and cams 6 and 7, respectively, arranged on their free ends act upon and are adapted to lift the roller 3 of the valve lever. Links 8 and 9 oscillate about their pivot 10 fixed to lever 11, the said pivot, on lever 11 being actuated, moving, as the cam is lifting the roller, in a circle whose centre approximately coincides with the joints connecting links 8 and 9 to rods 4 and 5, respectively.

If the two connecting rods and links shown in the drawings were given equal dimensions, then the two cams would execute equal movements and would, both of them, be suitable only for forward or for reversed running. On the contrary, by employing two connecting rods differing in length, the distances $lf$ and $lr$, respectively, between the points of connection of the links and the centre of the crank differing also, the rods will execute different movements. By appropriately choosing the distances one is enabled to provide that in accordance with the position of the operating lever 11 either cam 6 for forward running or cam 7 for reversed running will lift the roller 3, the other cam at the same time moving freely without coming in contact with the roller. In the middle position of lever 11 (Fig. 7) neither one nor the other cam comes in contact with the roller; on lever 11 being in the "forward" position (Fig. 5), only the path of the "forward" cam 6 (shown in full lines), in the "reverse" position (Fig. 6) only the path of the "reverse" cam 7 (shown in full lines) intersects with the roller.

The arrows in Figs. 5 and 6 indicate the direction of rotation of the machine for the time being. Thus, with lever 11 in the position shown in Fig. 5, the crank 12 rotates in a clockwise sense; on lever 11 being turned into the position shown in Fig. 6, the machine will rotate in an opposite direction.

For the sake of better understanding the two mechanisms are represented once more diagrammatically in Figs. 8 and 9, Fig. 8 showing the forward and Fig. 9 the reverse control in the position of travel. In both instances the cam is about to lift the roller; $lf$ is clearly shown to be greater than $lr$.

I wish it to be understood that I do not desire to be limited to the exact details of construction shown and described, for obvious modifications will occur to a person skilled in the art.

I claim:

1. In mechanism of the kind described in combination, a valve, a valve lever, two connecting rods, one for forward and the other for reversed running designed to govern said lever, a cam intermediate each connecting rod and said lever, a link connected to each rod, a single crank adapted to drive both said rods, an operating lever and a pivot on said lever common to both said links, the total lengths of said rods and the distances between the centre of said crank and the point of connection of said links to said rods differing in such wise, that in forward running only the forward and in reversed running only the reverse rod will act on said valve lever.

2. In mechanism of the kind described in combination, a valve, a valve lever, two connecting rods, one for forward and the other for reversed running, a cam on and a link connected to each rod, a single crank adapted to drive both said rods, an operating lever and a pivot on said lever common to both said links, the total lengths of said rods and the distances between the centre of said crank and the points of connection of said links to said rods differing in such wise, that in forward running only the forward and in reversed running only the reverse cam will contact with said valve lever.

In testimony whereof I affix my signature.

HUGO JUNKERS.